United States Patent [19]

Hardway, Jr.

[11] 3,732,553
[45] May 8, 1973

[54] CAPACITIVE PICK-OFF TRANSDUCER

[75] Inventor: Edward V. Hardway, Jr., Houston, Tex.

[73] Assignee: Spearhead, Inc., Houston, Tex.

[22] Filed: Apr. 16, 1971

[21] Appl. No.: 134,818

[52] U.S. Cl. ................................. 340/200, 323/93
[51] Int. Cl. .................................... G08c 19/10
[58] Field of Search ............... 340/200; 324/176; 323/75 P, 93, 128; 318/662

[56] References Cited

UNITED STATES PATENTS 3,221,256  11/1965  Walden ........................... 340/200
3,312,892  4/1967  Parnes ............................ 340/200

*Primary Examiner*—Thomas B. Habecker
*Attorney*—Hyer, Eickenroht, Thompson & Turner

[57] ABSTRACT

A capacitive pick-off transducer is disclosed in which small relative movement between aligned capacitive elements is utilized to provide an electrical output signal responsive to such movement. The capacitive elements include a fixed driven element having $2^n$ driven sectors each connected to one of two sources of input electrical signals of opposite phase, a fixed receptor element including $2^{n-1}$ active areas connected to an electrical signal output circuit, and a moveable shield element between the driven and receptor elements and including $2^{n-1}$ shielding lobes. Circuit means including a high gain amplifier with a negative feedback circuit are provided for maintaining the signal levels of the shield element and the active areas substantially lower than the absolute values (ignoring polarity) of the input signals, and preferably at or near ground.

17 Claims, 9 Drawing Figures

EDWARD V. HARDWAY, JR.
INVENTOR.

BY Hyer, Eckenroht,
Thompson & Turner

ATTORNEYS

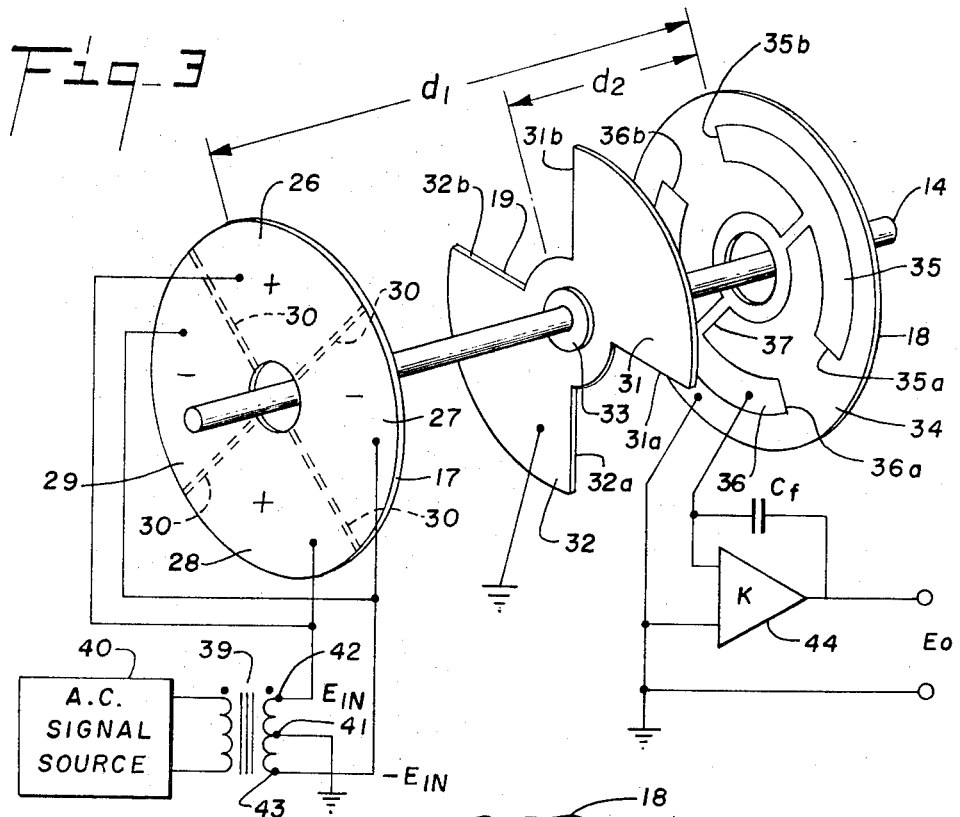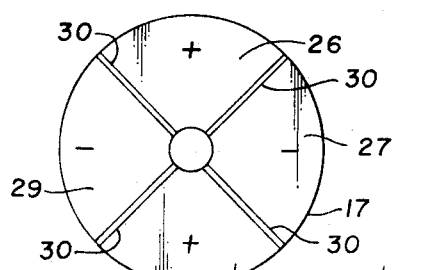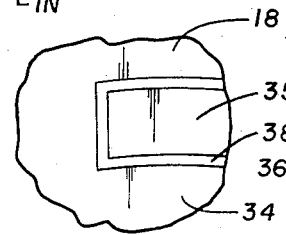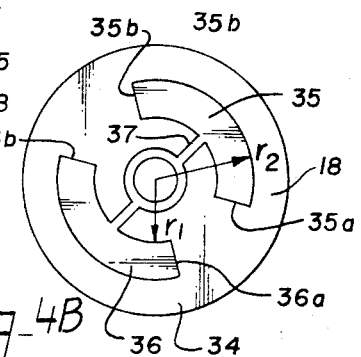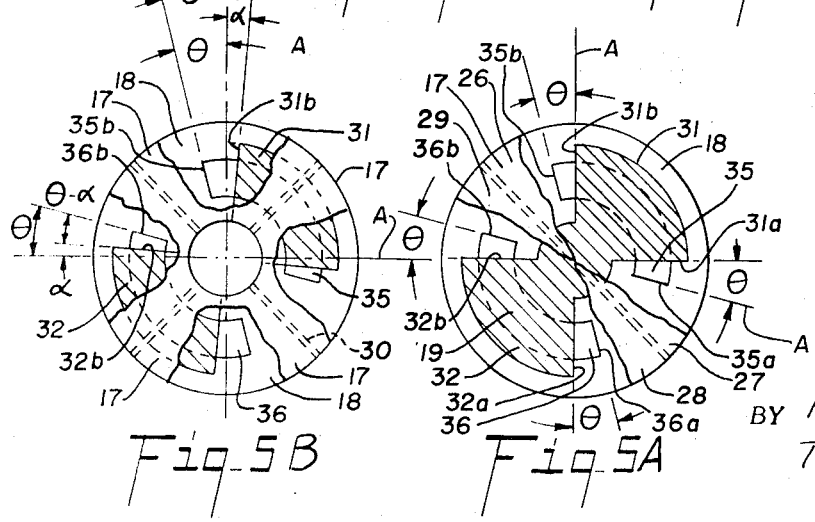

CAPACITIVE PICK-OFF TRANSDUCER

This invention relates to displacement measuring transducers and in one of its aspects to a capacitive pick-off transducer which responds to a small mechanical displacement to provide an electrical signal in response to such displacement.

There are many applications for displacement measuring transducers which measure small mechanical displacements or sense a small deviation from a balanced or null position. One important application is in instrumentation for inertial guidance systems for guided air and sea craft. In these systems gyros or pendulous elements respond to deviations from a desired course of movement to produce small rotary or rectilinear movements of, for example, a shaft. An electromechanical transducer or pick-off device is mechanically connected to this shaft and is generally at a balanced or no signal condition when the shaft is in a position representing zero deviation from the course of movement. The electrical pick-off device responds to the rotary or rectilinear movement of the shaft in response to deviation from the desired course to provide electrical signals proportional to this movement. These electrical signals may be used to drive servomotors which are connected in the guidance system to operate mechanisms which steer the craft being guided back to the desired course, which is again represented by a null or no signal condition of the pick-off device.

Since small percentage errors in guidance can result in excessive course deviations, the gyro or pendulous element pick-off must accurately respond to the small displacements involved, and yet offer neglible reaction torque to the gyro or pendulous element. Many different electromagnetic, electrostatic and optical devices have been designed in an attempt to meet these requirements. However, electromechanical devices, such as the microsyn, are quite costly as the faces of their poles and rotors must be ground with precision to minimize reaction torque at null and away from null, and even with this care the reaction torque will generally be more than desired in such applications. Also, the accuracy and reliability of such devices as the microsyn may be affected by stray electrical fields, high noise levels, null shift, and relatively low sensitivity.

Exotic optical pick-off devices have been developed in an attempt to provide higher sensitivity and lower reaction torque. These optical devices can have no reaction torque and provide good sensitivity and accuracy, but are so costly that they have not fulfilled the need for a relatively low cost, simple pick-off device which provides the required accuracy, sensitivity, and low reaction torque. Thus, the microsyn is still widely used as a gyro and pendulous element pick-off device.

While relatively inexpensive and simple electrostatic pick-off devices have been developed for measuring small displacement, these devices also have not replaced the microsyn type device for general usage as gyro and pendulous pick-off devices, primarily because they do not exhibit sufficient linearity. An example of such a device is the capacitive transducer disclosed in U.S. Pat. No. 3,221,256 issued Nov. 30, 1965, to Robert L. Walden, in which the shift in relative position of two adjacent capacitive elements is utilized to provide an output electrical signal proportional to this shift. However, the linearity and resolution of this device is affected by its relatively low gain, by any phase shift of the driving electrical signal, or by fringing effects between the capacitive elements. Also, deviations in spacing between the rotor and stator will affect its linearity so that certain critical tolerances must be maintained, and the device terminates with a relatively high impedance and requires additional circuitry for providing a low impedance output. For these reasons this device has not replaced microsyn type devices in general usage for gyro and pendulous element pick-off devices.

An improved capacitive transducer for general application is disclosed in the copending patent application of James A Parnell, Ser. No. 89,514, filed Nov. 13, 1970, which is a continuation of the patent application of that inventor, Ser. No. 688,500, filed Dec. 6, 1967, now abandoned. This device (hereinafter termed the "Parnell transducer") provides electrical output signals proportional to displacement, and greatly reduces fringing effects between the capacitive elements, and has infinite resolution, excellent repeatability, and high stability. Also, the Parnell transducer is relatively insensitive to forces which may cause changes in the dielectic spacing between the rotor and stator plates. This is accomplished in the disclosed preferred embodiment of the Parnell transducer by providing a rotatable grounded shield between a fixed driven plate connected to a source of input electrical signals, and receptor or conductive plate connected to an electrical read-out circuit. An active area on the receptor plate is clamped by a suitable circuit means to a very low signal level with respect to the input electrical signals to minimize capacitive coupling between the shield plate and the active area of the receptor plate. This transducer solves many of the technical problems of capacitive transducers provided by the prior art, yet is simple and relatively inexpensive to construct.

The present invention relates to a novel modification of the Parnell transducer which is particularly adaptable for use as a gyro or pendulous pick-off device, or in other applications where accurate and precise indications of small deviations from a balanced or null condition is required. Thus, the primary object of this invention is to provide such a device which has the advantages of the Parnell transducer and has characteristics such that it can replace microsyns and other costly pick-off devices for general usage in inertial guidance systems, or in other applications which require measurement of small displacements.

Another object of this invention is to provide such a pick-off device in which reaction torque is maintained at relatively low values, yet the device is relatively inexpensive, simple to manufacture and has high reliability and repeatability.

Another object of this invention is to provide such a pick-off device in which undesired relative motion between the elements of the transducer may be effectively cancelled or rendered ineffective, thus lessening the requirement for critical tolerances in the device.

Another object of this invention is to provide such a transducer in which the effects of stray capacity, and fringing between the elements is minimized and in which relatively low input and output impedances are provided.

Another object of this invention is to provide such a pick-off device which can be used with relatively simple and inexpensive electronic read-out and signal utilization circuits.

These and other objects are accomplished, according to the illustrated preferred embodiment of this invention by mounting a movable shield element between a driven element connected to a source of input electrical signals and a receptor element connected to an amplifier for providing an electrical output signal responsive to the relative capacitance between the respective elements. The driven element is divided into $2^n$ driven sectors ($n$ being a whole number of one or more) and each sector is connected to one of two sources of input electrical signals of opposite phase. The shield element includes $2^{n-1}$ shielding lobes and the receptor element includes $2^{n-1}$ active areas connected to the amplifier. The shield element is maintained at ground or at some low signal value with respect to the input signals (in absolute value with polarity being ignored), and the amplifier includes a negative feedback circuit which clamps the signal level on the active areas to some low signal level with respect to the input signals (also in absolute value with polarity being ignored). This arrangement results in minimizing the effect of stray capacitances and fringing between the capacitive elements. The capacitive elements are aligned with respect to each other so that a null or no signal position is obtained when the capacitance between the active areas and the sectors of the driven element connected to input signals of one phase, equals the capacitance between these active areas and the other sectors of the driven element connected to input signals of opposite phase. Movement of the shield element in one specified direction from the null position upsets this balance in the positive direction and a positive output is provided by the amplifier, and movement of the shield element in the opposite direction from the null position results in a negative output signal. The amplitude of the output signals are proportional to the distance moved in the respective direction. Movement in all directions but the specified and its opposite direction results in no change in effective capacitance between the capacitive elements, so that the transducer is relatively insensitive to such movements and to null shift.

In the drawings, wherein like reference numerals are used throughout to designate like parts, FIG. 1 is a front view of a housing in which the preferred form of capacitive pick-off transducer of this invention is mounted;

FIG. 3 is a diagrammatic view of a preferred form of capacitive pick-off transducer of this invention;

FIG. 4A is a view in elevation of the driven element of the transducer of FIG. 3;

FIG. 4B is a view in elevation of the receptor element of FIG. 3;

FIG. 4C is a blow-up of a portion of an active area on receptor element of FIG. 4B;

FIG. 5A is a partial cut-away view showing the alignment of the capacitive elements of the transducer of FIG. 3 in the null position;

FIG. 5B is a partial cut-away view showing the alignment of the capacitive elements of the transducer of FIG. 3 in a position indicating a positive or clockwise movement of the shield element from the null position.

Figure 2:
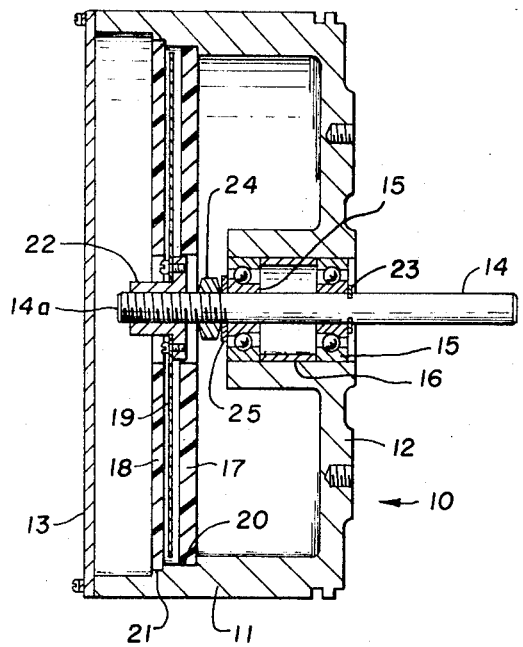
FIG. 2 is a sectional view taken at 2—2 of FIG. 1.

Referring to the drawings, the capacitive pick-off transducer 10 of the invention is described by the preferred embodiment illustrated in the context of two stationary elements or plates 17 and 18 and a rotary movable shield element or plate 19 therebetween, mounted in a suitable housing 11. However, the apparatus described can be easily modified in accordance with the teachings of this invention to provide for a linear motion capacitive pick-off transducer, including two stationary elements and a movable element mounted for straight line motion therebetween. Also, the capacitor elements may be flat, spaced-apart plates, or they may be cylindrical capacitive elements mounted for rotational or linear movement with respect to each other, without departing from the spirit of this invention.

Figure 1:
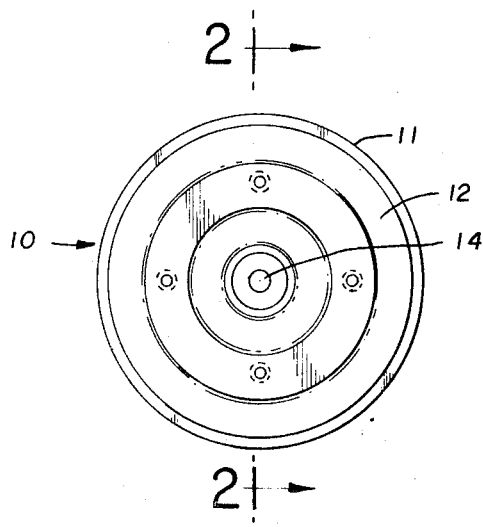

Housing 11 for transducer 10 illustrated in FIGS. 1 and 2 includes a cylindrical front member 12 and circular back cover 13, and the capacitive elements of the transducer are mounted therebetween. A rotatable shaft 14 extending from housing 11 is adapted to be coupled to a mechanical input element (not shown), such as a gyro or pendulous element, the small angular displacement of which is to be measured or sensed. Shaft 14 is mounted along its axis of rotation by suitable bearings 15 mounted in a hub 16 extending from housing member 12 into the interior of housing 11, and the bearings are spaced apart in hub 15 by a cylindrical sleeve 16. Electrical connections to the capacitive transducer may be made by wires (not shown) extending from capacitive elements 17 and 18 and through back cover 13. It is preferred that housing 11 be electrically grounded, and shield 19 is grounded through shaft 14.

Transducer 10 includes two circular, parallel capacitive elements or plates 17 and 18 fixably mounted in housing 11 and a movable element or plate 19 positioned in housing 11 in parallel relation between the other two plates. Plate 17 is a driven plate and is mounted on a shoulder 20 in housing 11, and plate 18 is a receptor plate and is mounted on shoulder 21 in housing 11, and both plates include openings in their center through which shaft 14 can pass without interference. Movable plate 19 comprises a rotatable shield and is mounted on shaft 14 for rotation therewith by a hub 22 screwed onto a threaded portion 14a of shaft 14, and is closely spaced from plates 17 and 18. Shaft 14 is tightly held against axial movement in bearings 15 by a snap ring 23 bearing against the front of bearings 15, and a nut 24 and washer 25 screwed on threads 14a and bearing against the back side of bearings 15.

Driven plate 17 may, for example, be formed on a circular disk made of an insulating plastic such as that used in printed circuit boards with a thin copper film covering the side of the disk facing plate 18. In the preferred embodiment illustrated in FIGS. 3 and 4A, the copper film is divided into four sectors 26, 27, 28 and 29 of equal size and insulated from each other by a thin separation 30. Driven plate 17 can be made by conventional printed board techniques.

Movable shield plate 19 is also preferably formed on a generally circular disk of insulated plastic, having opposing and equal pie-shaped portions cut away so that opposing and equal pie-shaped shielding portions or lobes 31 and 32 remain. In the embodiment described, lobes 31 and 32 of plate 19 each extend for about 90° circumferentially and on opposite sides of the plate so that plate 19 is in the form of a butterfly element. Plate 19 includes a thin copper metal coating covering one side of lobes 31 and 32 and electrically connected with shaft 14 through a metal bushing 33. Plate 19 rotates with shaft 14 and is assembled in housing 10 so that the side with the metal coating is facing towards receptor plate 18.

Receptor plate 18 also is preferably formed on a circular insulating plastic disk and comprises a single thin film of copper covering the entire side facing rotary shield plate 19 and includes at least one active area surrounded by a guard area. However, in the preferred embodiment of this invention illustrated in FIGS. 3, 4B and 4C, this film of copper is divided into a guard area 34 and two arcuate shaped active areas 35 and 36, electrically connected together by a link 37. Active areas 35 and 36 and link 37 are separated from guard area 34 by a small separation 38 surrounding active areas 35 and 36 and link 37, and between areas 35 and 36, link 37 and guard area 34. Each of active areas 36 and 35 extend circumferentially greater than 90° but substantially less than 180° so that adjacent edges 35a and 35b of area 35 are separated sufficiently by guard area 34 from adjacent edges 36a and 36b of area 36, so that coupling between these edges is minimized. In the preferred embodiment illustrated, each of active areas 35 and 36 have a circumferential extent of about 120° and their radial thickness is determined by the difference between radius $r_1$, from the center of plate 18 to the curved inner edge of each of areas 35 and 36, and a radius $r_2$ from the center of plate 18 to the curved outer edge of areas 35 and 36.

Each of the four sectors 26–29 of stationary plate 17 is coupled by a transformer 39 to a source of alternating current electrical signals 40. In the preferred embodiment illustrated, alternate sectors of plate 17 are connected to a source of such current that is 180° out of phase with respect to another source of such current connected to each of the remaining plates. As illustrated in FIG. 3, the primary of transformer 39 is connected to the output of signal source 40, and the secondary of transformer 39 includes a center tap terminal 41, which is grounded, and output terminals 42 and 43 respectively providing voltage signals E$in$ and —E$in$ of the same amplitude, but opposite phase. Sectors 26 and 28 of plate 17 are connected to terminal 42, and sectors 27 and 29 of plate 17 are connected to terminal 43 to provide the necessary signal sources of opposite phase to these sectors.

Guard area 34 of stationary plate 18 is also connected to ground while active areas 35 and 36 are connected to the input of a high gain amplifier 44 which includes a capacitor $C_f$ connected in a negative feedback circuit. Movable plate 19 is also connected to ground through the bushing 33 and shaft 14, which along with housing 11 is grounded.

Plates 17, 18 and 19 are arranged in a manner so that movable plate 19 acts as a variable shield between the other two. They are aligned with respect to each other along the axis of shaft 14 so that edges 35a and 35b of active area 35 extend circumferentially beyond the edges 31a and 31b of lobe 31 of plate 19, and the edges 36a and 36b of active area 36 extend circumferentially beyond the edges 32a and 32b of lobe 32 of plate 19. An angle $\theta$ is provided between the respective edges 35a, 35b, 36a and 36b and center lines A perpendicular to the axis of shaft 14, and plate 18 is aligned angularly with respect to shaft 14 so that the angles $\theta$ are equal as shown in FIG. 5A, and are angles of 15° for the embodiment illustrated. When transducer 10 is at a null or a no output signal condition, the relationship between plates 18 and 19 is such that equal angles $\theta$, as shown in FIG. 5A, are also provided between each of the described adjacent edges of active areas 35 and 36 and lobes 31 and 32. Also, plate 17 is aligned along the axis of shaft 14 so that separation 30 between each of sectors 26 and 29, and sectors 27 and 28 are preferably half-way between edges 35b and 36b, and 35a and 36a, respectively, and separation 30 between sectors 26 and 27 and sectors 28 and 29 fall respectively half-way in between edges 35a and 35b of area 35 and edges 36a and 36b of area 36. Since the net capacitance in a parallel plate capacitor is directly proportional to the surface areas of the plates, the capacitance between the plates 17 and 18 is proportional to the portion of the active areas 35 and 36 not shielded from plate 17 by movable plate 19.

Since, in FIG. 5A, the exposed areas of active areas 35 and 36 are equal, as represented by equal angles $\theta$, the positive capacitive coupling between sectors 26 and 28 and active areas 36 and 35 equals the negative capacitive coupling between sectors 27 and 29 and active areas 35 and 36, and no output signal is provided by amplifier 44. With the arrangement described, by rotation of shaft 14 in a clockwise direction, the angular relationship between edge 35b of area 35 and the adjacent edge 31b of shield lobe 31, and between edge 36a of area 36 and the adjacent edge 32a of shield lobe 32 is increased by a small angle $\alpha$, thus increasing the exposure of areas 35 and 36 to positive charge sectors 26 and 28 by an amount proportional to angle $\alpha$. At the same time, the angular relationship between edge 35a of area 35 and the adjacent edge 31a of shield lobe 31, and between edge 36b of area 36 and the adjacent edge 32b of shield lobe 32 is decreased by the same angle $\alpha$, thus decreasing the exposure of areas 35 and 36 to negative charge sectors 27 and 28 by an amount proportional to angle $\alpha$. This relationship is illustrated in FIG. 5B. In this case, the output $E_o$ is a positive value proportional to the active area exposed to positive charge sectors 26 and 28 less the active area exposed to sectors 27 and 29, and thus indicative of the position of shaft 14 with respect to the null position of FIG. 5A. When shaft 14 is moved counterclockwise from a null position (no angle $\alpha$) the relationship between the various plates is such that the charge between active areas 35 and 36 and negative charge sectors 27 and 29 increases due to more exposure between these areas, and the charge between active areas 35 and 36 and positive charge sectors 26 and 28 decreases due to less exposure between these areas. In this case the output signal $E_o$ will be a negative value proportional to the active area exposed to negative charge sectors 27 and 29 less the active area exposed to positive charge sectors 26 and 28, and will be indicative of the counterclockwise position of shaft 14 with respect to the null position of FIG. 5A.

It is highly desirable that the distance $d_1$ between plates 17 and 18 and the distance $d_2$ between plates 18 and 19 be kept small and that the distance $d_2$ be small compared to the length or circumference of the active areas 35 and 36 on plate 18. This minimizes any curvature or fringing effect in the field between the plates 18 and 17. In the embodiment illustrated in FIG. 3, the values of $d_1$ and $d_2$ are about 0.05 inch and 0.01 inch respectively.

Figure 6:
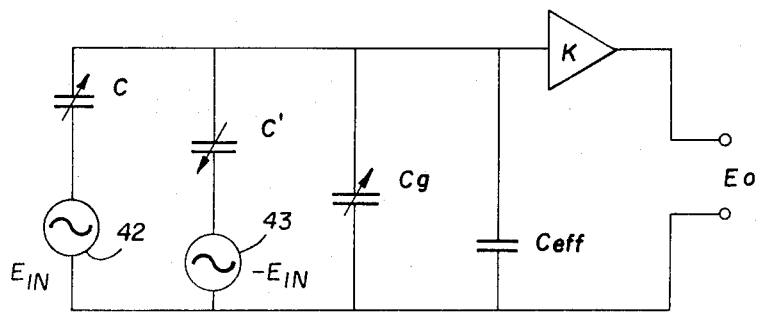
FIG. 6 is a schematic view showing the equivalent circuits of the transducer of FIG. 3 and the electrical input and output circuits connected to it.

As the plates 18 and 19 are placed close together, the capacitance between plate 19 and the active areas 35 and 36 is quite large compared to the capacitance between the plates 17 and 18, especially since elements 31 and 32 of plate 19 cover the major part of active areas 35 and 36. In effect, a capacitive divider is formed as illustrated by the equivalent circuit of FIG. 6. A variable capacitor $C$ corresponds to the capacitance between the positive sectors 28 and 26 of plate 17 and active areas 36 and 35, and a variable capacitor $C'$ corresponds to the capacitance between the negative sectors 27 and 29 of plate 17 and active areas 35 and 36. The size of the capacitors $C$ and $C'$ are equal when transducer 10 is at a null or no signal position (FIG. 5A) and vary inversely with respect to each other as shaft 14 is rotated either clockwise or counterclockwise from the null position. Also, a capacitive $Cg$ is formed between active areas 35 and 36 and shielded plate 19, and other grounded surroundings, and in order to have an accurate indication of the combination of capacitances $C$ and $C'$ between plate 17 and active areas 35 and 36 as a function of the position of shaft 14, the effect of the capacitance $Cg$ must be eliminated or minimized to a point where it has negligible effect on the output signal $E_o$.

The effect of the capacitor $Cg$ is minimized in the capacitive pick-off transducer of this invention by maintaining plate 19 and active areas 35 and 36 each at a very low signal level with respect to the input signals E$in$ and $-$E$in$ (ignoring polarity) and preferably at substantially the same signal level. This is accomplished in the embodiment illustrated in FIG. 3 by connecting active areas 35 and 36 to an input circuit of the high gain amplifier 44 including a negative feedback capacitor $C_f$ so that the input circuit is maintained at "virtual ground" (substantially zero signal level). Since movable shield plate 19 is grounded and the active areas 35 and 36 are maintained at virtual ground, there is practically no A.C. or signal field between plates 18 and 19. Also, since guard area 34 of plate 18 is grounded and housing 11 is grounded, stray capacity and fringing effects are further minimized and the electrical fields between plates 17 and 18 will be substantially parallel with the axis of shaft 14.

Referring again to FIG. 6, the values of $C$ and $C'$ are defined by the following formulas:

$$C = [0.225\ (r_2^2 - r_1^2)]/d_1\ (0 + \alpha) \tag{1}$$

$$C' = [0.225\ (r_2^2 - r_1^2)]/d_1\ (0 - \alpha) \tag{2}$$

with all dimensions in inches, radians and picofarads, with an air dielectric between the capacitive elements.

The effective input impedance of high gain amplifier 44 connected to active areas 35 and 36 looks like a capacitor $C_{eff}$ wherein:

$$C_{eff} = C_f K, \tag{3}$$

and $K$ is the open loop gain of amplifier 44. By this arrangement $C_{eff}$ can be made several orders of magnitude larger than $Cg$ at its maximum value to effectively shunt $Cg$ and render it ineffective. Accordingly with $k \gg C_f/Cg$ the output $E_o$ of amplifier 44 can be closely approximated to be:

$$E_o = (C - C')/C_f\ \text{E}in;\ \text{and} \tag{4}$$

combining formulas (1) and (2), $$E_o = .45\ \text{E}in\ (r_2^2 - r_1^2)/(d_1 C_f)\ \alpha \tag{5}$$

defining $E_o$ as a function of the angle $\alpha$, and thus the position of shaft 14 with respect to null.

As noted in the aforementioned patent application of James A. Parnell, a unity gain amplifier can be connected between active areas 35 and 36 and shield plate 19 to clamp the signal levels of these areas to virtually the same value. Also, the higher the gain of amplifier 44, the closer the voltage at the input is to the signal level of movable plate 19. While a gain in the order to 50,000 is preferred, lesser gains will be adequate for many uses as long as the effect is that the signal level on active areas 35 and 36 is maintained at a very low level compared to the signal level E$in$ of the driving signal. Of course, since shielded plate 19 is at or near ground, its signal level will also be very low with respect to the level E$in$ of the driving signal. Also, since $-$E$in$ is actually below ground, which is the reference voltage, reference herein to the signal levels on plates 18 and 19 as being low with reference to the input signals E$in$ and $-$E$in$ has reference to absolute values with the polarities ignored. Thus, if E$in$ is 10 volts, $-$E$in$ is a negative 10 volts, the voltage on shield plate 19 is zero volts, and the voltage on active areas 35 and 36 is 0.5 volts positive, these latter two voltages would be lower in absolute value than the first two.

Also, while the embodiment described has four sectors on driven plate 17, two shielding lobes on plate 19, and two active areas on plate 18, other combinations in which the driven plate has $2^n$ driven sectors and shield plate 19 and receptor plate 18 have $2^{n-1}$ lobes and active areas respectively are contemplated by this invention. n is a whole number of one or more, however, when n is one, certain errors caused by misalignment between plates 17, 18 and 19 will not cancel as they will with n being two or greater. The larger the value of $n$, the greater the output sensitivity and the smaller the usable angle $\alpha$. In the embodiment of FIG. 3 where n = 2, a usable angle $\alpha$ of about $\pm 10°$ is provided, it being necessary to limit the angle so that excessive fringing between the edges of active areas 35 and 36 and shield elements 31 and 32 does not occur. The value of n and the usable angle $\alpha$ will depend on the type of application to which the device will be put.

It should be noted, in transducer 10, since plate 19 and active areas 35 and 36 are maintained at substantially the same signal level and the capacitance therebetween is accordingly effectively eliminated, small movements of the plate 19 towards or away from the plates 17 and 18 produces no undesirable effects. As a result, only separation between the fixed plates 26 and 28 must be carefully controlled. In addition, because of the effect of the opposing capacitances $C$ and $C'$ of opposite polarity, where n is two or more, plate 19 may have a fair degree of freedom of movement in all directions with respect to the plates 17 and 18 except about the axis of shaft 14. Any force transversely directed with respect to the axis of the shaft 14 tending to change the parallel position of plate 19 will produce little change or no error, and any rocking of plate 19 about the axis of shaft 14 will provide the same result.

Thus, for small deviations, the net effect of any shaft runout, or of a small error in perpendicularity between shield plate 19 and the axis of shaft 14, is substantially zero, and the net effect of axial movement of shield plate 19 is a very slight change in overall sensitivity with no shift in zero or null. These factors are very important in nulling applications and where very small displacements are being sensed.

Also, torques and forces in capacitive pick-off transducer 10 are quite small and net torque is zero as the rate of change of total capacity with changes in angle is zero. For this reason the transducer described is particularly applicable to use as a pick-off device for gyro and pendulous elements.

The output from amplifiers 44 is an alternating voltage of the same form as that provided by the input signal source 40. In some cases the alternating voltage will be converted to a direct current signal. This can be accomplished by precision rectifying circuits using high gain direct current amplifiers with rectifiers in the feedback circuit. Also, the frequency stability of the signal source 40 is not critical since the transfer function of the system as a ratio of capacitive reactance provides a low impedance source, without the use of resistance elements which make the system phase sensitive. Thus, the output $E_o$ can be readily matched to a suitable electrical readout for indicating the position of shaft 14 or circuits for driving servomotors or the like in response to changes in the position of shaft 14 from a null position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Apparatus for converting relatively small displacements into output electrical signals, comprising, in combination: an input electrical signal driven element including $2^n$ electrically conductive driven sectors, each of said driven sectors adapted to be connected to one of two sources of input electrical signals of opposite phase; a receptor element in a substantially fixed relation with respect to said driven element, said receptor element including $2^{n-1}$ electrically conductive active areas; a shield element including $2^{n-1}$ shielding lobes positioned between and adjacent said driven element and said receptor element and disposed to effectively shield portions of said active areas from electrostatic coupling with said driven sectors; and means for providing relative movement between said shield element and said receptor and driven elements in response to a displacement to be sensed.

2. The apparatus of claim 1 further including first means for maintaining said shield element at a first signal level substantially lower than the signal level of said input electrical signals, and circuit means for maintaining said active areas at a second signal level substantially lower than the signal level of said input electrical signals.

3. The apparatus of claim 1 further including circuit means connected to said active areas for providing an electrical output signal responsive to the relative position of said shield element with respect to said driven and receptor elements.

4. The apparatus of claim 2 wherein said circuit means is connected to said active area and provides an output electrical signal responsive to the relative position of said shield element with respect to said receptor and driven element.

5. The apparatus of claim 1 wherein each of said driven, receptor and shield elements are disks and said shield element is mounted on a rotatable shaft so that said apparatus responds to an angular displacement of said shaft to provide said output electrical signals.

6. The apparatus of claim 2 wherein said circuit means maintains the signal level on said receptor element at substantially the same signal level as said shield element.

7. The apparatus of claim 2 wherein said first means includes means for grounding said shield element, and said circuit means maintains said active area at substantially the same signal level as said shield element.

8. The apparatus of claim 2 wherein said circuit means includes a high gain amplifier connected to said active area for providing an electrical output signal responsive to the position of said shield element with respect to said receptor element, and a feedback circuit connected from the output of said amplifier to said active areas for providing an effective capacitance in shunt with the capacitance between said receptor and shield element, said effective capacitance being sufficiently larger than said capacitance between said receptor and shield element so that said receptor element is maintained at a substantially zero signal level with respect to said shield element.

9. The apparatus of claim 1 wherein said driven element includes four driven sectors, said shield element includes two shielding lobes, and said receptor element includes two active areas.

10. Apparatus for converting relatively small displacements into output electrical signals, comprising, in combination: an input electrical signal driven element including $2^n$ electrically conductive driven sectors, each of said driven sectors adapted to be connected to one of two sources of input electrical signals of opposite phase; a receptor element in a substantially fixed relation with respect to said driven element, said receptor element including at least one electrically conductive active area; a shield element including $2^{n-1}$ shielding lobes positioned between and adjacent said driven element and said receptor element; means for providing relative movement between said shield element and said receptor and driven elements in response to a mechanical displacement; first circuit means for maintaining said shield element at a first signal level substantially lower than the signal level of said input electrical signals; and second circuit means connected to said active areas for providing said output electrical signals responsive to the relative position of said shield element with respect to said driven and receptor elements, and including means for maintaining said active areas at a second signal level substantially lower than the signal level of said input electrical signals.

11. The apparatus of claim 10 wherein said first and second signal levels are substantially equal.

12. Apparatus as defined in claim 10 wherein said second circuit means comprises means for providing an effective capacitance in shunt with the capacitance between said receptor and shield elements, said effective capacitance being sufficiently larger than said capacitance between said receptor and shield element so that said receptor element is maintained at a substantially zero signal level with respect to said shield element.

13. Apparatus as defined in claim 10 wherein said second circuit means includes an amplifier circuit having a negative feedback circuit.

14. Apparatus as defined in claim 13 wherein said negative feedback circuit includes capacitive means coupled between the input and the output of said amplifier.

15. The apparatus of claim 10 wherein each of said driven, receptor, and shield elements are disks and said apparatus responds to an angular displacement to provide said output electrical signals.

16. The apparatus of claim 15 wherein said driven element includes four driven sectors, said shield element includes two shielding lobes, and said receptor element includes two active areas.

17. The apparatus of claim 10 wherein said receptor element includes $2^{n-1}$ active areas.

* * * * *